(12) United States Patent
Tsuboi et al.

(10) Patent No.: US 6,552,449 B2
(45) Date of Patent: Apr. 22, 2003

(54) STAGE SYSTEM WITH ONBOARD LINEAR MOTOR

(75) Inventors: Takaaki Tsuboi, Kanagawa-ken (JP); Masaki Ohno, Kanagawa-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 10/116,754

(22) Filed: Apr. 5, 2002

(65) Prior Publication Data
US 2002/0163257 A1 Nov. 7, 2002

(30) Foreign Application Priority Data
May 2, 2001 (JP) ......................................... 2001-135214

(51) Int. Cl.$^7$ .......................... H02K 41/00; G03B 27/42
(52) U.S. Cl. .............................. 310/12; 310/12; 310/90; 74/496.99; 355/53; 430/22; 378/34
(58) Field of Search ............................................ 310/12

(56) References Cited

U.S. PATENT DOCUMENTS

| | | | | |
|---|---|---|---|---|
| 5,684,856 A | * | 11/1997 | Itoh | 378/34 |
| 5,858,587 A | * | 1/1999 | Yamante | 430/22 |
| 5,969,441 A | * | 10/1999 | Loopstra | 310/12 |
| 6,064,467 A | * | 5/2000 | Takizawa | 355/53 |
| 6,082,010 A | | 7/2000 | Lee | |
| 6,134,981 A | * | 10/2000 | Novak | 74/490.09 |
| 6,363,809 B1 | * | 3/2002 | Novak | 74/490 |
| 6,396,566 B2 | * | 5/2002 | Ebinuma | 355/33 |
| 6,414,742 B1 | * | 7/2002 | Korenaga | 335/53 |

FOREIGN PATENT DOCUMENTS

| | | |
|---|---|---|
| DE | 221 317 A1 | 4/1985 |
| JP | 9-266660 | 10/1997 |
| JP | 266659/1997 | 10/1997 |
| JP | 352744/2001 | 12/2001 |

OTHER PUBLICATIONS

European Patent Office, Patent Abstracts of Japan: Abstract for JP 10271868, "Movable Stage Device", Sony Corp. (Oct. 9, 1998).

European Patent Office, Patent Abstracts of Japan: Abstract for JP 57189558, "Circular–Arc Linear Motor", Takahashi Yoshiteru (Nov. 20, 1982).

European Patent Office, Patent Abstracts of Japan: Abstract for JP 02041650, "Quasi–Curved Linear Motor", Shinko Electric Co Ltd (Feb. 9, 1990).

European Patent Office, Patent Abstracts of Japan: Abstract for JP 05130765, "Linear Motor For Curve", Hitachi Kiden Kogyo Ltd (May 25, 1993).

* cited by examiner

*Primary Examiner*—Nestor Ramirez
*Assistant Examiner*—Iraj A. Mohandesi
(74) *Attorney, Agent, or Firm*—Browdy and Neimark, P.L.L.C.

(57) ABSTRACT

Here is disclosed a stage system enabling position control of a tiny angle by virtue of a linear motor and becoming greater in response ability, with even slimness and small size in construction. The stage system has a first stage lying on a base stage for linear movement in an X-direction relatively to the base stage, a second stage lying on the first stage for linear movement relatively to the first stage in a Y-direction, a turning stage lying on the second stage to be supported through rolling bearing means on the second stage, and a turning linear motor for driving the turning stage over a tiny amount of angle in either direction of rotation. The turning linear motor is comprised of a primary side of more than one armature winding arranged in juxtaposition in straight line on the second stage, and a secondary side of field magnets arranged in juxtaposition in opposition to the armature winding on the turning stage, with magnetic poles alternating in polarity in straight line.

13 Claims, 11 Drawing Sheets

STAGE SYSTEM WITH ONBOARD LINEAR MOTOR

BACKGROUND OF THE INVENTION

1. Field of the Invention

The present invention relates to a stage system with onboard linear motor to provide a position controller energized with a linear motor, which has been extensively used in fields as diverse as semiconductor industries, industrial robots, inspection equipments, machine tools, and so on.

2. Description of the Prior Art

A slider unit with onboard linear motor made compact or slim in construction is disclosed in Japanese Patent Laid-Open No. 266659/1997, in which a small linear-motor table system is made to propel any one of confronting bed and table relatively to another. A solenoid-energized linear actuator is installed between the bed and the table, at least any one of which serves for a yoke of the solenoid-energized linear actuator, thus allowing the linear-motor table system to be made slim in size and in expensive in production cost.

Disclosed in Japanese Patent Laid-Open No. 266660/1997 is an X-Y table system that adopts a solenoid-energized linear actuator to be made compact or slim in construction. With the X-Y table cited earlier, all of a power line for the solenoid-energized linear actuator and wires for taking out signals from various sensors are held together on an intermediate moving member of X-table and assembled into a single cord that will be connected to any outside control unit. This arrangement helps lessen any potential negative affection that might be otherwise caused by the wires and realize well the high speed, durability, less occurrence of debris and overall shrinkage in size.

Figure 12:
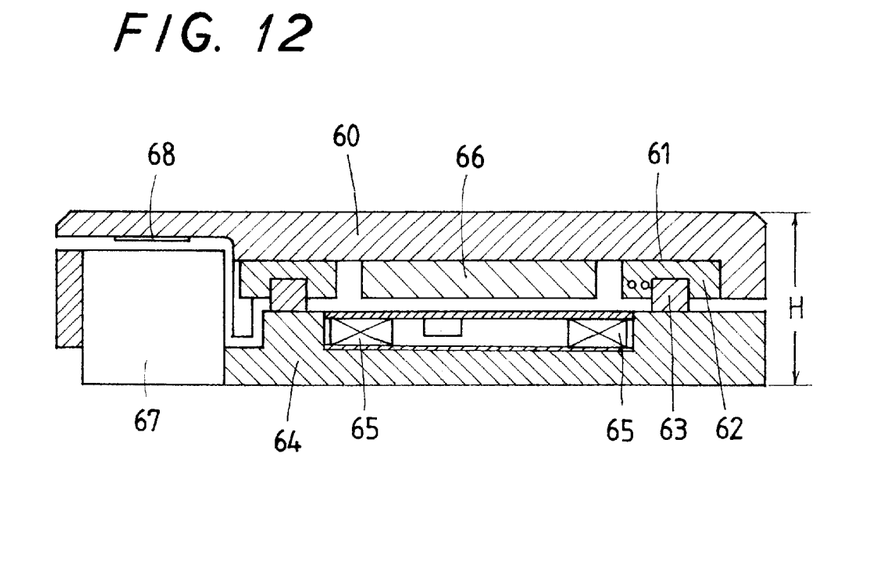
FIG. 12 is a sectional view showing an example of a slide unit made slim in construction with onboard linear motor.

Moreover, a slider unit constructed as illustrated in FIG. 12 has already been developed and disclosed in the co-pending senior application that was opened under Japanese Patent Laid-Open No. 352744/2001. The slider unit has an onboard moving-magnet linear motor and is envisaged improving high-speed operation and much response ability of the movable table 60 relatively to the stationary bed 64 and also realizing much more accurate position control of the table 60 to the bed 64. With the slider unit, the three-phase conduction system is adopted for conduction to any armature winding 65 while the driving circuit is removed to any outside driver. This design can provide the bed 64 that is made simple in construction and also reduced in height. The stationary bed 64 in the slider unit is made of magnetic material while the movable table 60 is also made of magnetic material and arranged for sliding movement with respect to the bed 64 through a linear motion guide unit 61 that is mainly comprised of a slider 62 and a track rail 63. The movable table 60 has mounted thereon with a field magnet 66 on which magnetic poles are arranged in such a way that they alternate in polarity along a traveling direction of the table 60, while the bed 64 has the armature windings 65 on a surface of the bed 64, which is in opposition to the field magnet 66. In addition, there is provided a position detector composed of a linear scale 68 and a sensor 67 to determine the position of the table 60 with respect to the bed 64 in the traveling direction of the table 60.

Figure 13:
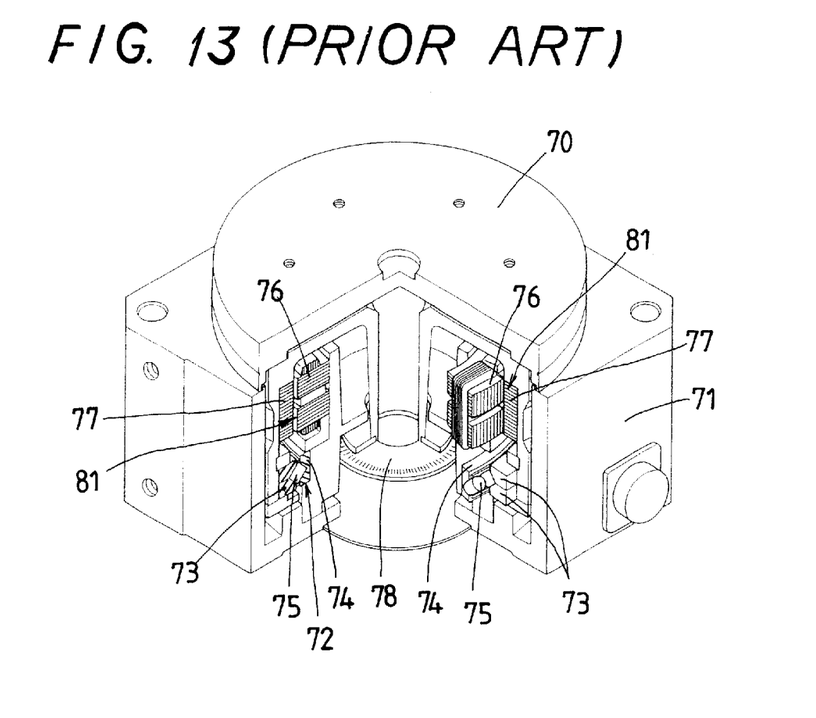
FIG. 13 is a perspective view, partially broken away, showing a prior rotary table system.

Moreover referring to FIG. 13, there is shown a prior rotary table system in which a servo-actuator is connected directly to a motor 81 in direct-drive manner to accomplish the very fast, highly accurate position control in turning direction with no backlash or no lost motion. The servo-actuator to control an angular position of a table 70 with high speed is mainly comprised of the motor 81, an optical encoder 78 and a rolling-contact bearing 72. The motor 81 is comprised of a rotor core 77 fixed to the table 70, and a stator core 76 mounted on a housing 71. With the rotary table system stated earlier, the table 70 is encased in the housing 71 for free rotation through the rolling-contact bearing 72 that is composed of an inner ring 74, an outer ring 73 and rollers 76. The rolling-contact bearing 72 is constructed with a crossed-roller bearing in which the rollers 75 are arranged circumferentially with their axes intersecting alternately one another in such a manner that each roller can carry the table 70 against any load in every direction, either radial or axial.

By the way, the table-position control system or the stage system used commonly for various machines such as semiconductor fabricating equipments is to move the work such as a semiconductor stock and the like, which is mounted on the movable table, in any one or both of X-direction and Y-direction perpendicular to the X-direction, and/or turn the work over an angle θ thereby transferring the work to any desired position. To keep the workroom environment clean, the linear motors have been extensively employed for the driving means to move the table or the stage, whether linear or angular. Recently the systems that are used to manufacture the semiconductors are legion, and the semiconductor industries, image processors, inspection instruments or the like further need the position controls of high accuracy, even with compactness and inexpensiveness.

With the rotary table system as shown in FIG. 13, nevertheless, the rotor core 77 of the motor 81 is arranged overall around the periphery of the table 70 while the stator core 76 is installed circumferentially in an annular groove in the housing 71 in opposition to the rotor core 77. This type of the prior rotary table system results in becoming tall in height and a corresponding increase in dimensions, and also would get complicated in construction itself. The prior stage system as stated earlier and shown in FIG. 12 uses the linear motor, but only to propel the table in linear direction through the linear motion guide unit, not to provide position controls in a circular or angular direction. Thus, it remains a major challenge to provide a stage system that will be allowed to not only travel in linear direction, but also provide accurate position control in circular direction or in angular θ direction by the use of some linear motors, which are substantially identical to one another in construction to reduce the desired parts and members making up the stage system in their numbers, thereby helping make the stage system smaller in dimensions, lighter in weight, even with better in response ability than the same sort of prior table system ever developed.

SUMMARY OF THE INVENTION

It is the primary object of the present invention to overcome the major problem as described just above and to provide a stage system with onboard linear motor, which is constructed to allow position control of tiny angles in either direction of turning or in θ direction. Still more particular object of the present invention is to provide a stage system with onboard linear motor, which may afford a moving table high-precision angular-position control and better response ability, even being made thin and small in dimensions, light in weight and compact or slim in construction.

The present invention is concerned with a stage system with onboard linear motor, comprising an anti-turning stage kept against rotation, a turning stage lying on the anti-turning stage for rotation relatively to the anti-turning stage, a rolling bearing means interposed between the anti-turning stage and the turning stage to support the turning stage for free rotation, and a turning linear motor for driving the turning stage over a tiny amount of angle in either direction of rotation, wherein the turning linear motor is comprised of a primary side of more than one armature winding arranged in juxtaposition in straight line on either one of the turning stage and the anti-turning stage, and a secondary side of field magnets arranged in juxtaposition in opposition to the armature winding on another of the turning stage and the anti-turning stage, with magnetic poles alternating in polarity in straight line.

In an aspect of the present invention, there is provided a stage system with onboard linear motor, in which the turning linear motor is oriented so as to extend in line with a tangent of an arc depicted by the turning stage. In another aspect of the present invention, moreover, a stage system with onboard linear motor is provided in which the turning linear motor has a means for sensing a position of the turning stage in turning direction with respect to the anti-turning stage, the sensing means being composed of a linear scale graduated lengthwise in fine pitches and attached on the arched periphery of the turning stage, and a sensor element installed in opposition to the linear scale to read graduations on the linear scale. In another aspect of the present invention, moreover, a stage system with onboard linear motor is provided in which the rolling bearing means is constituted with a cross-roller bearing that is composed of an inner ring, an outer ring arranged around the inner ring for rotation with respect to the inner ring, and roller interposed between the inner ring and outer ring, with their rolling axes being crossed alternately one another.

In a further another aspect of the present invention, there is provided a stage system with onboard linear motor, in which the anti-turning stage is made at central area thereof with an aperture in which the outer ring of the rolling bearing means is fitted, while the turning stage is provided with an annular boss having an outside periphery around which the inner ring of the rolling bearing means fits over the annular boss, and the turning stage is also made at a center thereof with a rectangular window that is in alignment with the aperture in the anti-turning stage. In another aspect of the present invention there is provided a stage system with onboard linear motor, in which the anti-turning stage is composed of a first stage lying on a base stage for linear movement in an X-direction relatively to the base stage, and a second stage lying on the first stage for linear movement relatively to the first stage in a Y-direction crossing the X-direction, and the turning stage lies on the second stage to be supported through the rolling bearing means on the second stage. In a further aspect of the present invention, moreover, a stage system with onboard linear motor is provided in which a first linear motor is provided to move the first stage to a desired position in the X-direction, and a second linear motor is provided to move the second stage to a desired position in the Y-direction.

In another aspect of the present invention there is provided a stage system with onboard linear motor, in which the turning, first and second linear motors equally have one set of three armature windings, each of which carries any one phase of three-phase conduction system, and the first, second and turning stages are each propelled to their desired positions by virtue of electromagnetic force that will be generated when three-phase current in the armature windings interacts electromagnetically with field flux created by the field magnets. In another aspect of the present invention, moreover, a stage system with onboard linear motor is provided in which the field magnets are made of rare-earth magnet and five pieces of field magnets are arrayed in straight line in opposition to each set of three armature windings.

In another aspect of the present invention there is provided a stage system with onboard linear motor, in which linear movement of the first stage in the X-direction relatively to the base stage is guided through a first linear motion guide unit that is composed of an elongated track rail lying on the base stage in the X-direction and a first slider mounted to the first stage and supported on the track rail for linear movement, while linear movement of the second stage in the Y-direction relatively to the first stage is guided through a second linear motion guide unit that is composed of a second track rail lying on the first stage in the Y-direction and a second slider mounted to the second stage and supported on the track rail for linear movement. In a further another aspect of the present invention, a stage system with onboard linear motor is provided in which the first, second, and turning stages are equally made with transparent windows, which parallel each other.

In another aspect of the present invention there is provided a stage system with onboard linear motor, in which first sensing means for determining a relative position of the first stage to the base stage is constituted with an optical encoder that is made up of an optical linear scale attached to the first stage and a sensor element mounted to the base stage in opposition to the optical linear scale, while second sensing means for determining a relative position of the second stage to the first stage is another optical encoder made up of an optical linear scale installed on the second stage and a sensor element mounted to the first stage in opposition to the optical linear scale. In another aspect of the present invention, moreover, a stage system with onboard linear motor is provided in which all the first, second and turning stages are made in a form of rectangular plate.

With the stage system of the present invention constructed as stated earlier, the turning linear motor is especially made up of the primary side of some armature windings arrayed in juxtaposition in straight line on either one of the turning stage and the anti-turning stage, and the secondary side of field magnets arranged in juxtaposition in opposition to the armature windings on another of the turning stage and the anti-turning stage, with magnetic poles alternating in polarity in straight line. This construction of the turning linear motor is good enough in operation to provide angular position control over a tiny amount of turning of the turning stage, with even keeping the stage system simple in construction. In addition, the construction in which the turning part is constituted with the field magnets of permanent magnet contributes to reducing the turning part itself in weight, improving the response ability in turning motion of the turning part with even less overall thickness, making certain fewer occurrences of debris that might be caused by the stage system itself, and also making the system small in overall size.

In accordance with the stage system of the present invention constructed as described above, the linear motor that has been predominantly used for position control in any linear direction is adopted just as it is to provide angular position control over tiny angle of turning. This concept realizes the stage system that allows high-precision position control of tiny angle of turning and high response ability in position control, with even small in size, simple in construction and weighing less. Linear position control in either direction of X- and Y-directions is done by other linear motors to move the anti-turning composite stage of an X-stage and a Y-stage kept against turning. With the stage system of the present invention stated earlier, standardized armature windings and field magnets are interchangeable to yield all of the turning linear motor to force the turning stage in circular direction and other linear motors to move the composite stage in linear direction, with simply requiring any modification in mounting of the linear scale. This results in a reduction in a number of parts and components as well as in production costs compared with the conventional systems. This stage system of the present invention is available well for various machines such as semiconductor manufacturing equipments, industrial robots, inspection instruments, machine tools and so on.

DETAILED DESCRIPTION OF THE PREFERRED EMBODIMENTS

A preferred embodiment of a stage system with onboard linear motor according to the present invention will be explained hereinafter in detail with reference to the accompanying drawings.

A stage system of the present invention, as opposed to the linear motion guide unit having the slider means with onboard moving-magnet linear motor stated earlier with reference to FIG. 12, has mounted with bearing means for turning, in which there is incorporated a turning linear motor 13 for driving means to move a turning stage 3 over a tiny amount of angle relatively to a second stage 2 in any turning direction, especially to allow the turning stage 3 to provide accurate angular position control of any tiny angle. The present stage system features rotary stage means referred herein as θ-stage means, in which a moving-magnet linear motor, for example in FIG. 12 is adapted for the turning linear motor 13, as shown in FIGS. 3 to 7, to move the turning stage 3 over a minute angular amount in the turning direction or θ-direction, bringing a component or part such as a work and so on to any desired angular position.

Figure 1:
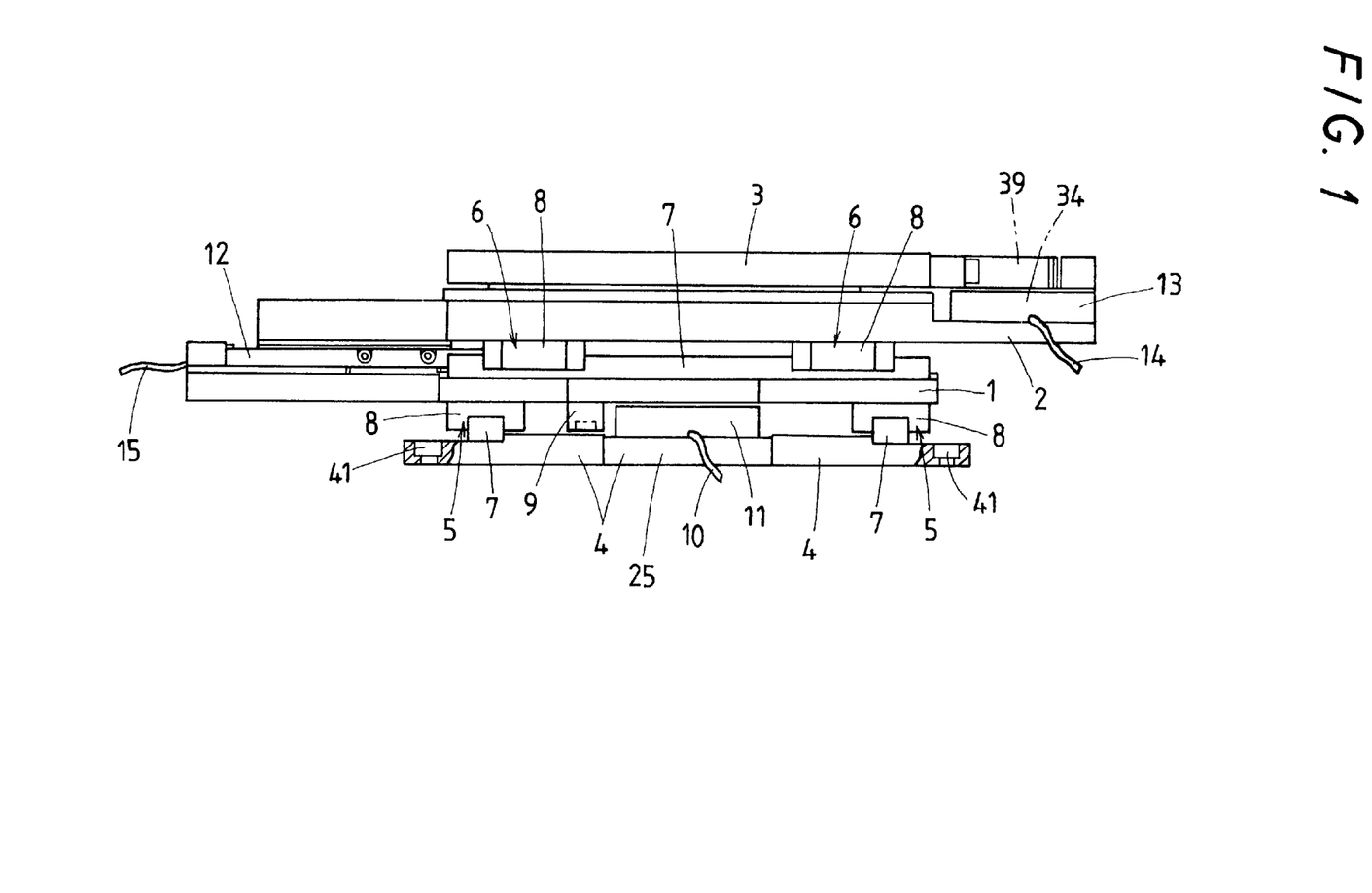
FIG. 1 is a front elevation, viewed in an X-direction, showing a preferred embodiment of a stage system with onboard linear motor in accordance with the present invention.
Figure 2:
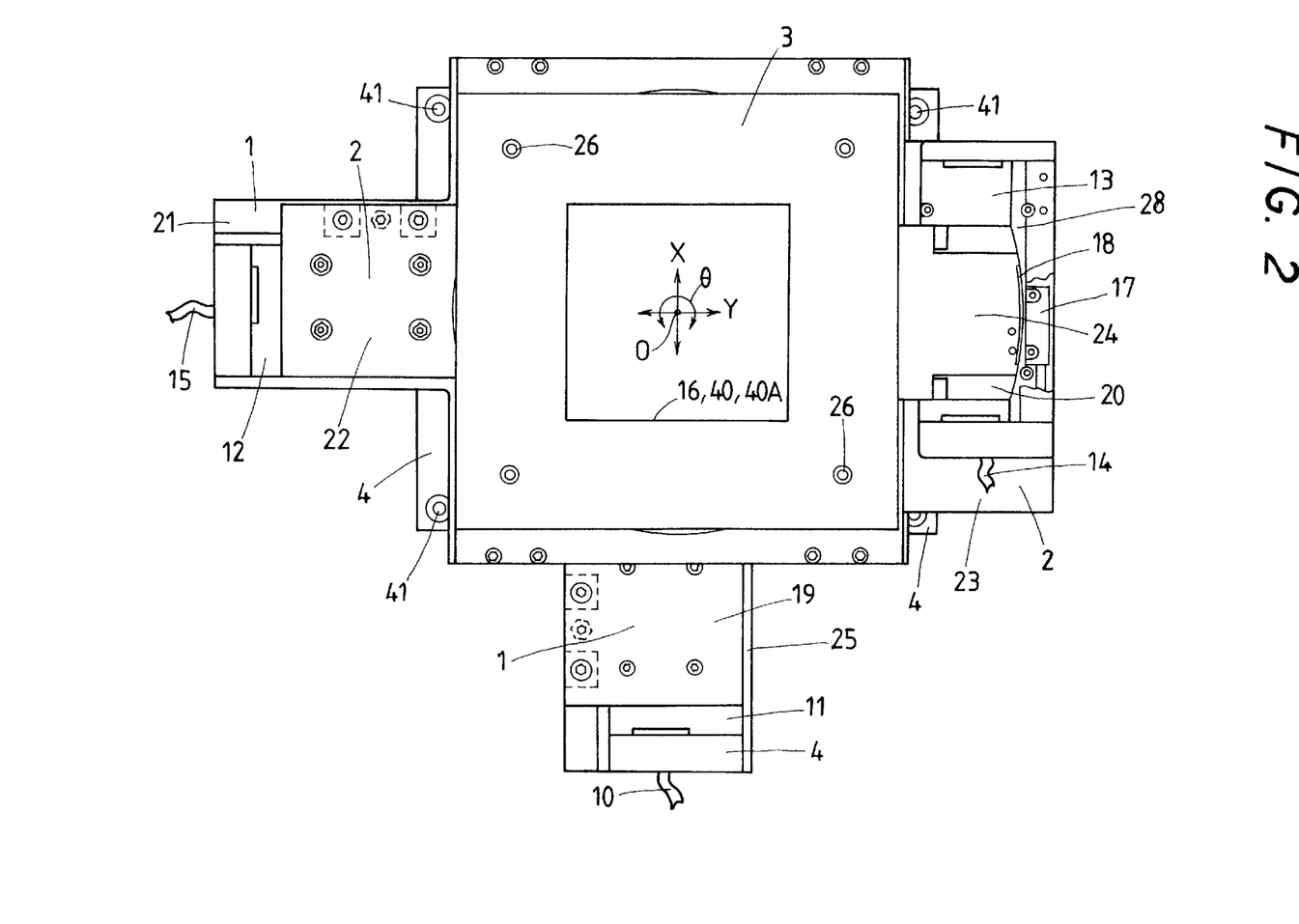
FIG. 2 is a top plan view of the stage system illustrated in FIG. 1.
Figure 3:
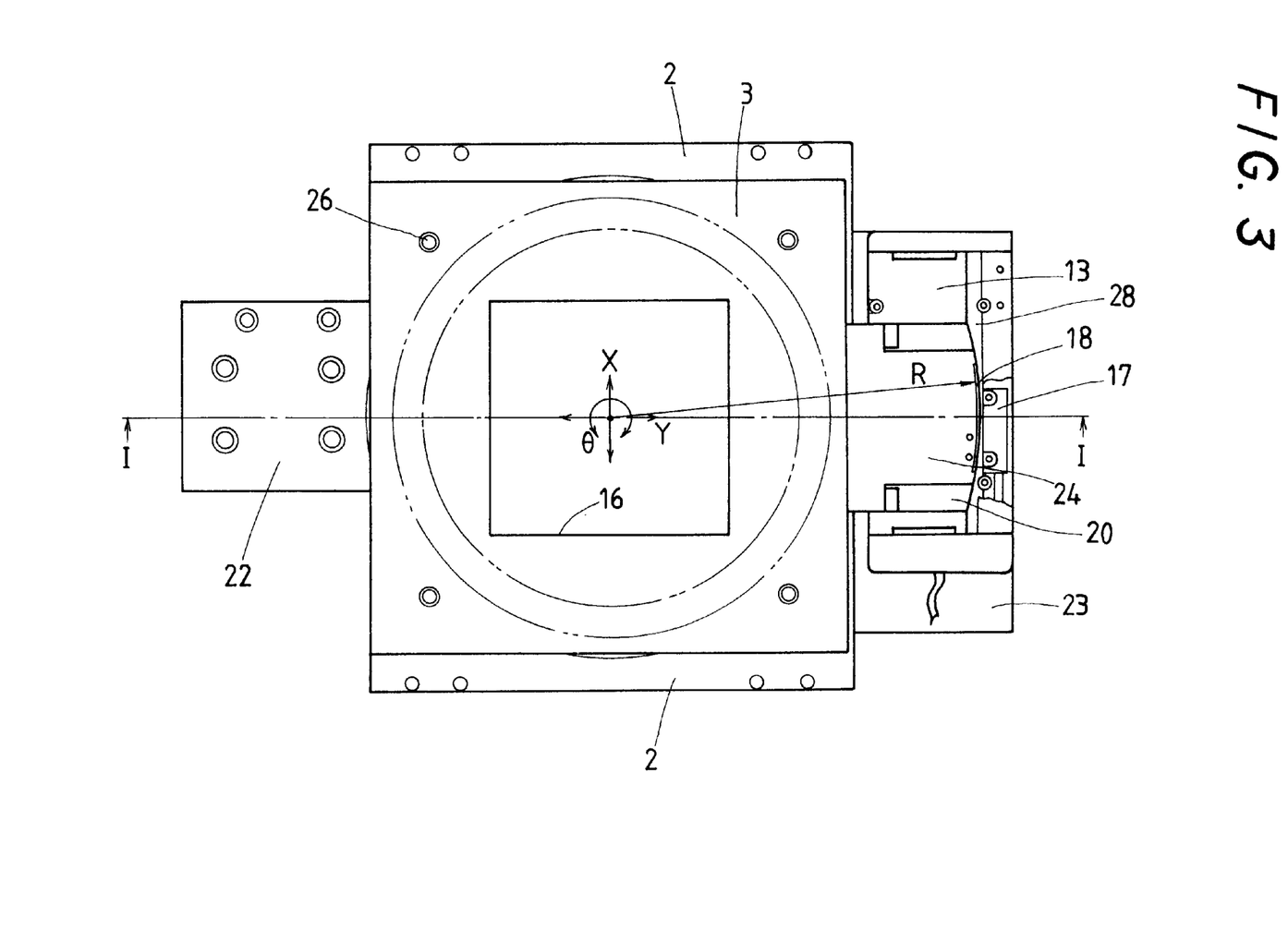
FIG. 3 is a top plan view showing a turning stage that provides angular position control for the stage system in FIGS. 1 and 2.

Referring to FIGS. 1 and 2, there is illustrated the stage system of the present invention mainly constructed with an XY-θ composite stage system in which the rotary stage means or θ-stage means is combined with an XY-stage composed of a first stage 1 movable linearly in X-direction and a second stage traveling back and forth in Y-direction normal to the X-direction, so that a component or part such as the work is positioned on any two-dimensional plane in X-, Y- and θ-directions.

With the embodiment stated earlier, all the first stage 1, second stage 2 and the turning stage 3 are made in a substantially rectangular form that may make easy to attach the linear motor on every stage 1, 2, 3 to drive them and also make sure the smooth position control in X-direction, Y-direction and turning direction.

Moreover, the first stage 1, second stage 2, turning stage 3 and a base stage 4 are made with transparent windows 16, 35, 40, 40A, respectively. The center O common to all the windows 16, 35, 40, 40A is the standard for position controls of the first stage 1 relatively to the base stage 4 in X-direction and of the second stage 2 relatively to the first stage 1 in Y-direction, and thus the turning stage 4 is brought into any desired position in X-, Y- and θ-direction.

The stage system of the present invention, as shown in FIGS. 1 and 2, is made with bolt holes 4 in which fastening bolts fit to mount the stage system onto any stationary counterpart, and has the base stage 4 kept normally against movement, the first stage 1 mounted on the base stage 4 for linear motion relatively to the base stage 4 in X-direction, the second stage 2 arranged on the upper surface of the first stage 1 for linear motion of itself in Y-direction lying across the X-direction, but linked with the first stage 1 to move together in the X-direction, and the turning stage 3 arranged on the upper surface of the second stage 2 to be allowed to turn alone in any turning direction or θ-direction, but linked with the second stage 2 to move together in either side of the X- and Y-directions.

Figure 4:
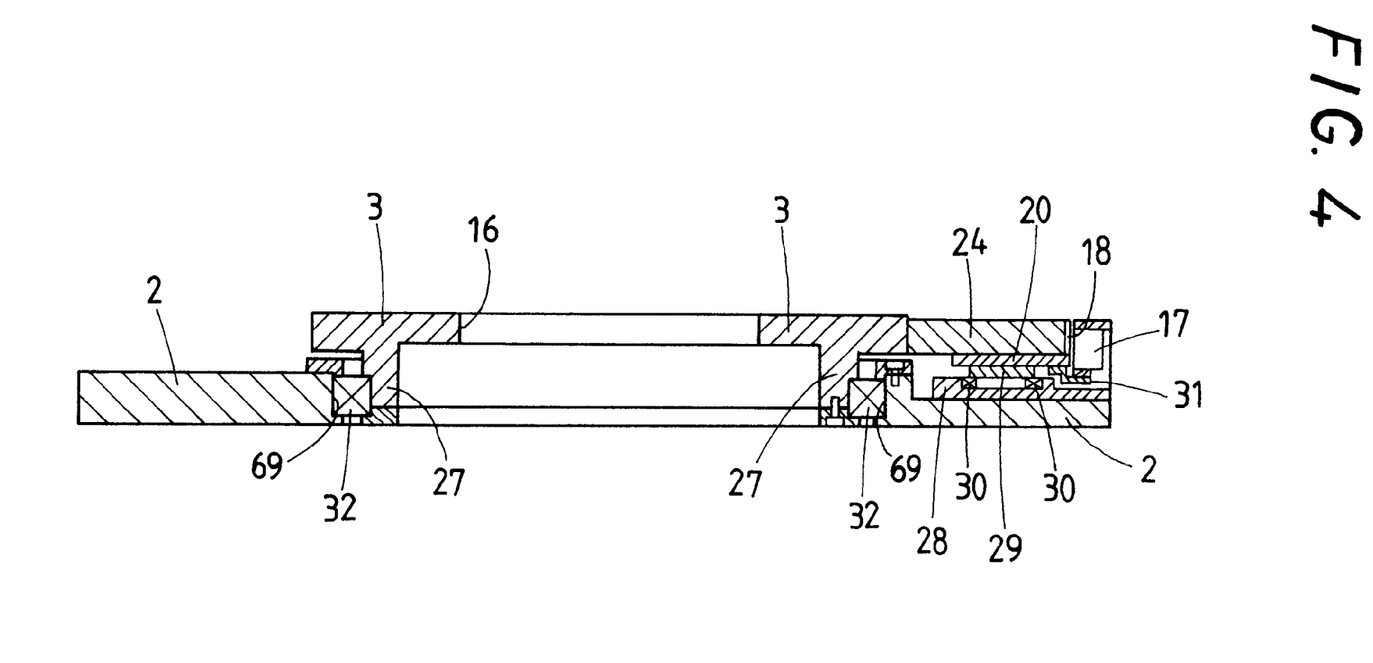
FIG. 4 is a sectional view of the turning stage taken on the plane of the lines I—I of FIG. 3.

The stage system moreover includes a pair of first linear motion guide units 5 arranged between the base stage 4 and the first stage 1 to allow the first stage 1 to travel in the X-direction, a pair of second linear motion guide units 6 interposed between the first stage 1 and the second stage 2 to guide the second stage 2 in the Y-direction, and rolling bearing means 32 such as cross-roller bearings and so on, shown in FIG. 4, arranged between the second stage 2 and the turning stage 3 to support the turning stage 3 for rotation in any θ-direction.

The stage system of the present invention stated earlier also includes a first linear motor 11 arranged between the base stage 4 and the first stage 1 to propel the first stage 1 to any desired position in the X-direction, a second linear motor 12 arranged between the first stage 1 and the second stage 2 to move the second stage 2 to an desired position in the Y-direction, and a turning linear motor 13 installed between the second stage 2 and the turning stage 3 to provide angular position control in either θ-direction of rotation. Reference numeral 9 in FIG. 1 denotes a stopper block while reference numerals 10, 14 and 15 represent lines connected to armature windings of the linear motors 11, 12 and 13, respectively.

The present stage system features that it, especially as shown in FIGS. 3 to 7, has the composite stage held against turning in either direction of rotation, the turning stage 3 lying on the second stage 2 of the composite stage for turning motion, the rolling bearing means 32 supporting the turning stage 3 for rotation, and the turning linear motor 13 to force the turning stage 3 in either circular direction, the turning linear motor 13 being composed of field magnets 29 and armature windings, both of which are arrayed in straight line in opposition to each other. It will be understood that the composite stage kept against turning is comprised of the first stage 1 mounted on the topside of the base stage 4 for linear motion in only the X-direction with respect to the base stage 4, and the second stage 2 lying on the topside of the first stage 1 for linear motion in only the Y-direction with respect to the first stage 1.

The stage system of the present invention is characterized in that a linear motor by nature to provide linear force and motion contributes to torque production to move the turning stage 3 in either direction of rotation. The turning linear motor 13 is a primary side 34 having more than one armature winding 30, three windings in FIG. 5, set in juxtaposed array in straight line on any one, for example the second stage 2 in the embodiment stated herein, of the confronting turning stage 3 and second stage 2, and a secondary side 39 having field magnets 29, shown in FIG. 7, arranged on the turning stage 3 in opposition to the armature windings 30 in such a way that unlike poles alternate in polarity along the array of the armature windings 30. Moreover, the turning linear motor 13 is oriented so as to extend in line with a tangent of an arc depicted by the turning stage 3. This arrangement of the turning linear motor 13 contributes to making the stage system simple and slim in construction.

With the stage system constructed as stated earlier, the first stage 1 has an apron 21 extending sideways from any one side of sidewise opposing sides thereof, while the second stage 2 has an overhang 22 that lies roughly midway any one end of forward and aft ends in the Y-direction of the second stage 2 and extends in the Y-direction in parallel with the apron 21 of the first stage 1. The second stage 2 is further provided with a platform 23 that lies roughly midway the opposite end of the forward and aft ends in the Y-direction of the second stage 2 and extends in the Y-direction in the form of plate to support the turning linear motion 13 thereon.

On the platform 23 of the second stage 2 there is installed a bed 28 on which the three armature windings 30 for the turning linear motor 13 lie in juxtaposition in line with the tangent of an arc depicted by the turning stage 3. On the other hand, the field magnets 29 are arranged confronting the armature windings 30 in straight line on a table 20 that is installed underneath a lug 24 extending out of the turning stage 3. The lug 24 has an origin mark 31.

Moreover, the turning stage 3 has means for sensing an angular position of the turning stage 3 relatively to the second stage 2. The sensing means is made up of a linear scale 18 graduated lengthwise in fine pitches and attached on an arched periphery of the lug 24 of the turning stage 3, and a sensor element 17 mounted on the platform 23 of the second stage 2 in opposition to the linear scale 18 to read the graduations on the linear scale 18.

The rolling bearing means 32, for example as shown in FIG. 13, is constituted with a cross-roller bearing that is composed of an inner ring, an outer ring arranged around the inner ring for rotation with respect to the inner ring, and cylindrical rolling elements or rollers interposed between the inner ring and outer ring. With the rolling bearing means 32 in the embodiment stated here, the inner ring is fixed to the turning stage 3 while the outer ring is held in the second stage 2 through a retainer ring 79. In the embodiment shown in FIGS. 5 and 6, the second stage 2 is made at the central area thereof with an aperture 69 to provide the window 35 into which the outer ring of the rolling bearing means 32 is fitted, while the turning stage 3 is provided on the underneath thereof with an annular boss 27 having an outside periphery around which the inner ring of the rolling bearing means 32 fits over the annular boss 27. The turning stage 3 is also made at the center thereof with the rectangular window 16 that is in alignment with the aperture 69 in the second stage 2. The cylindrical rollers of the rolling elements are arranged circumferentially with their axes being crossed alternately in a manner of the cross-roller bearing, thereby supporting the turning stage 3 for rotation through the inner ring that fits over the boss 27 underneath the turning stage 3.

Figure 5:
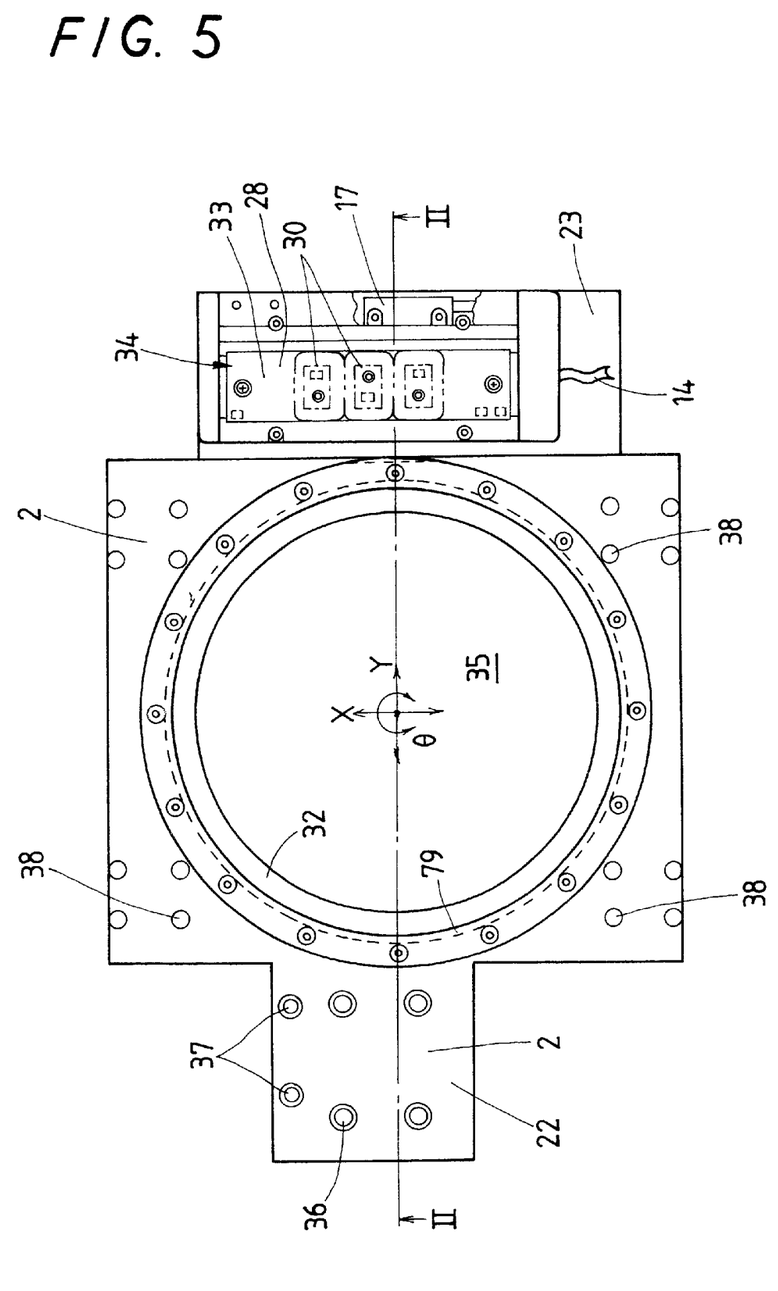
FIG. 5 is a top plan view showing a second stage of the stage system exposed when the turning stage of FIG. 3 is removed.

The second stage 2 lying on the upper surface of the first stage 1 is made with bolt holes 38 in which fastening bolts fit to hold the second stage 2 on sliders 8 of second linear motion guide units 6. Underneath the overhang 22 of the second stage 2 there is mounted the secondary side or field magnets, not shown, for the second linear motor 12. The overhang 22 is made with bolt holes 36, as shown in FIG. 5, in which fastening bolts fit to secure underneath the second stage 2 a bed to accommodate the field magnets, (secondary) of the second linear motor 12 thereon. Underneath the overhang 22 there is also provided two projections, not shown, which are spaced apart from one another and arranged to lie at fixed space apart on opposite sides with respect to a stopper 57 on the first stage 1, one to each side, so as to serve as stopper means that, when coming into abutment against the stopper 57 on the first stage 1, will keep the second stage 2 against escape out of the first stage 1. In FIG. 5, there are shown only bolt holes 37 in which fastening bolts will fit to hold the projections underneath the overhang 22.

With the present stage system stated earlier, the first linear motor 11 is to provide linear position control of the first stage 1 in X-direction with respect to the base stage 4, and the second linear motor 12 provides linear position control of the second stage 2 in Y-direction relatively to the first stage 1. The first, second and turning linear motors 11, 12 and 13 equally have one set of three armature windings 30, 43, 53, each of which carries any one phase of three-phase conduction system. The first, second and turning stages 1, 2 and 3 are each propelled to their desired positions by virtue of electromagnetic force that will be generated when three-phase current in the armature windings 30, 43, 53 interacts electromagnetically with field flux created by the field magnets 29, 49. In each linear motor, the field magnets 29, 49 are made of rare-earth magnet and five pieces of field magnets are arrayed in straight line in opposition to each set of three armature windings 30, 43, 53.

Figure 8:
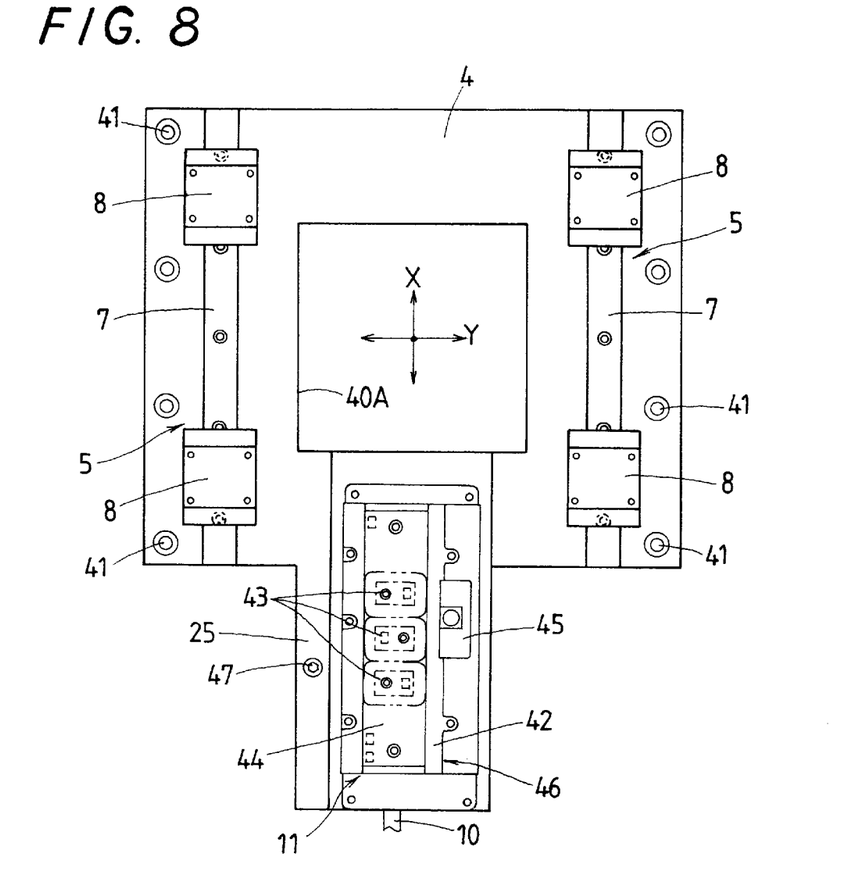
FIG. 8 is a top plan view of a base stage in the stage system shown in FIGS. 1 and 2.
Figure 9:
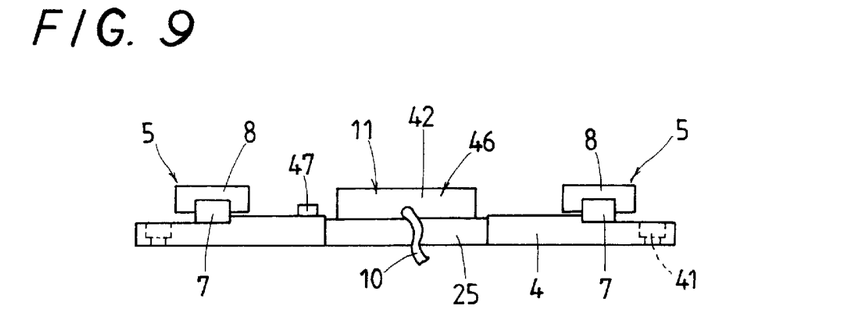
FIG. 9 is a front elevation, viewed in an X-direction, showing the base stage in FIG. 8.

Referring next to FIGS. 8 and 9, there is shown the base stage 4 of a rectangular plate, which is made at the center thereof with the rectangular window 40A and also has an extension 25 lying roughly midway any one end of forward and aft ends in the X-direction of the base stage 4. The linear motion guide units 5 lie on the base stage 4 across the window 40A, one to each side, with extending in parallel with one another in the X-direction. On the extension 25 there is installed the first linear motor 11 to force the first stage 1 in the X-direction towards any desired position. Linear movement of the first stage 1 in the X-direction relatively to the base stage 4 is guided through the first linear motion guide units 5 each composed of an elongated track rail 7 lying on the base stage 4 in the X-direction, and a first slider 8 mounted underneath the first stage 1 and supported on the track rail 7 for linear movement. On the extension 25 of the base stage 4 there is also mounted an armature winding assembly 44 serving for a primary side 46 of the first linear motor 11. The armature winding assembly 44 includes a bed 42 held on the extension 25, the primary side 46 of the armature windings 43 mounted on the bed 42, and a sensor 45 installed on the bed 42. The armature winding assembly 44 is connected to the electric line 10.

Figure 10:
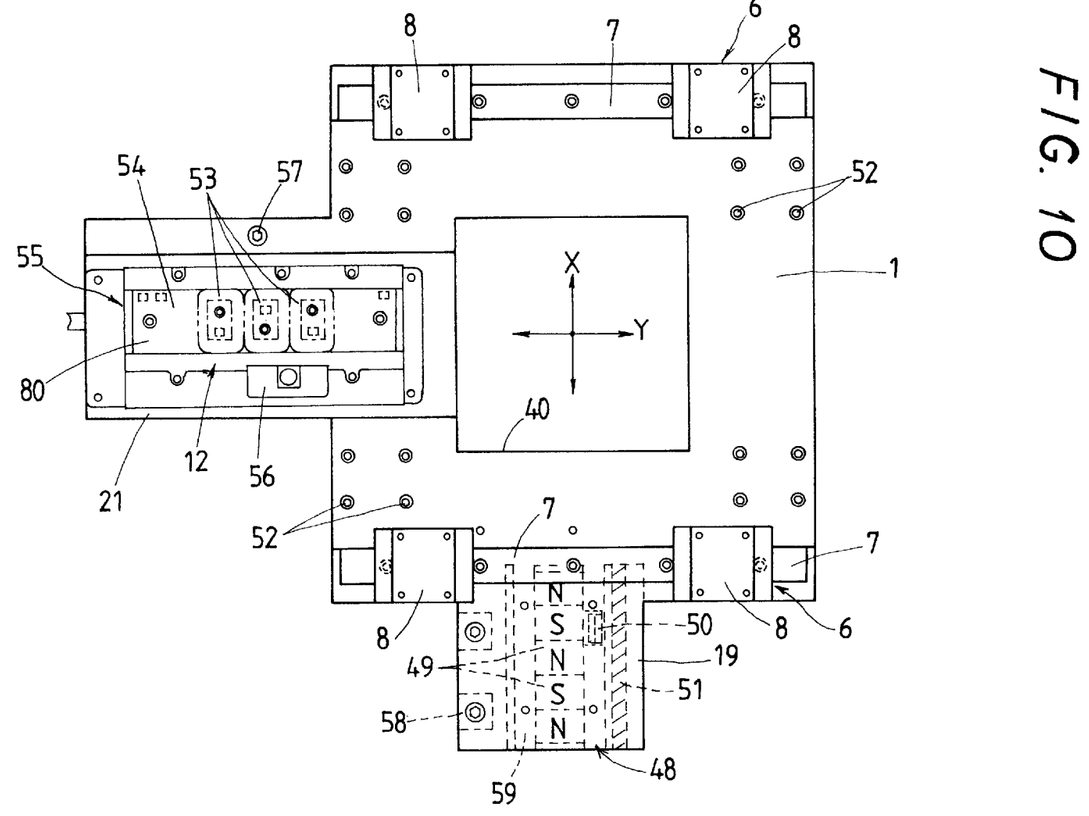
FIG. 10 is a top plan view showing a first stage in the stage system of FIGS. 1 and 2.

The first linear motor 11 is moreover made up of the primary side 46 of more than one armature winding 43, three windings in FIG. 8, arrayed in juxtaposition in straight line on the bed 43 mounted on the extension 25, and a secondary side 48 of field magnets 49 that are held underneath the first stage 1 in opposition to the armature winding assembly 43 and arranged in juxtaposition in such a way that magnetic poles alternate in polarity in the X-direction, which is the moving direction of the first stage 1. While the bed 42 for the primary side 46 is held on the extension 25 of the base stage 4 so as to lengthwise parallel the X-direction, the secondary side 48 of the first linear motor 11, as shown in FIG. 10, is held in a table 59 attached to the bottom of the first stage 1. The base stage 4 is made with more than one bolt hole 41 in which a bolt fit to fasten the base stage 4 to any stationary counterpart. The extension 25 of the base stage 4 has the stopper 47 that, when cooperating with the stopper 58 projecting downwards underneath the first stage 1, serves for keeping the first stage 1 against runaway beyond a preselected travel range. The stopper 47 on the base stage 4 is constituted with a bolt head raised above the base stage 4 nearby the bed 42 of the first linear motor 11.

Figure 11:
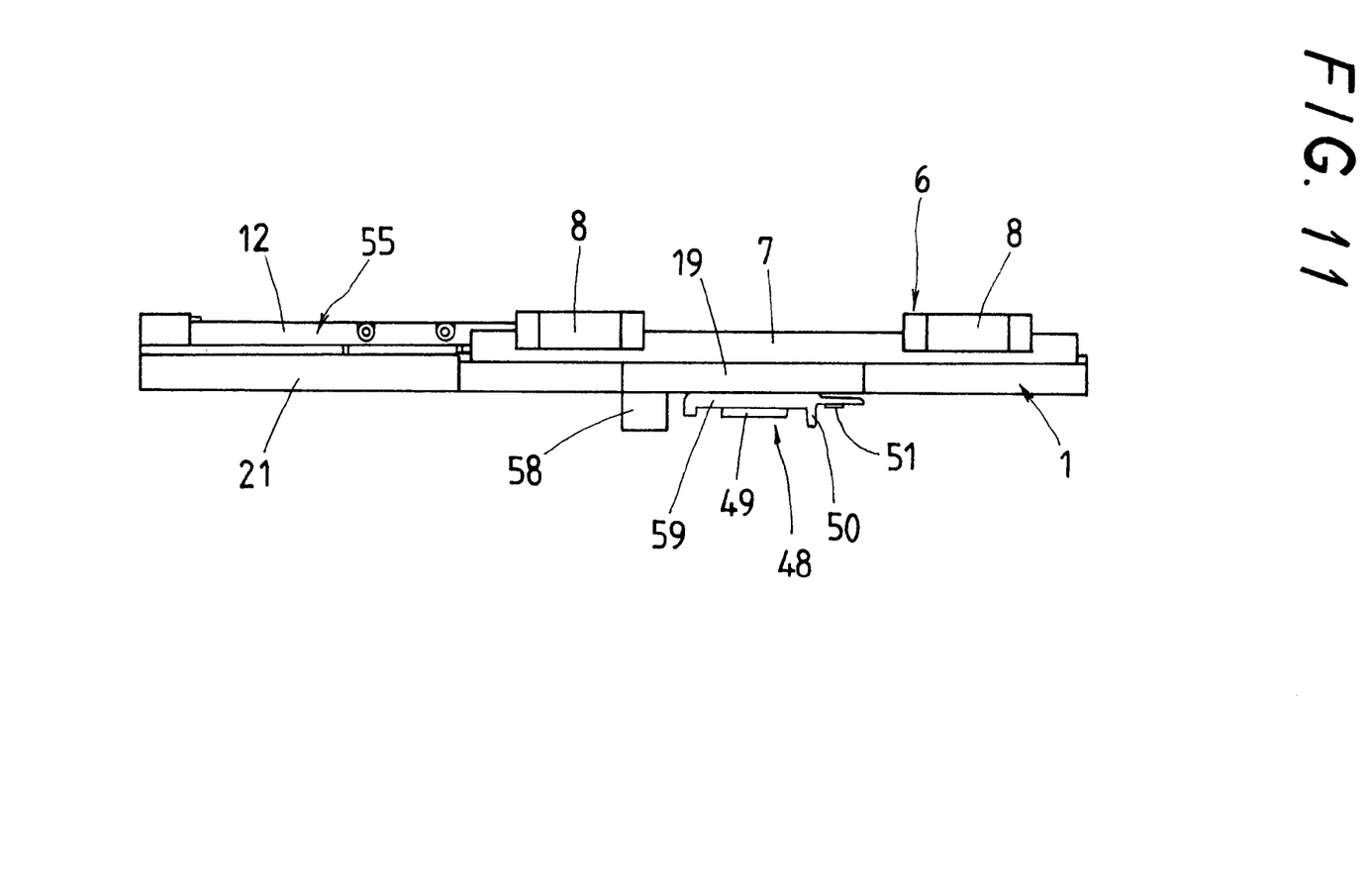
FIG. 11 is a front elevation, viewed in an X-direction, of the first stage shown in FIG. 10.

The first stage 1, as shown in FIGS. 10 and 11, is made of a rectangular plate having at the center thereof a window 40 that is just as rectangular as the window 40A in the base stage 4 and placed in alignment with the window 40A. The first stage 1 has an overhang 19 that lies roughly midway any one end of forward and aft ends in the X-direction of the first stage 1 and extends in the X-direction in parallel with and in opposition to the extension 42 of the base stage 4, and the apron 21 lying roughly midway the opposite ends of the first stage 1 in the Y-direction of the second stage 2 and extends sidewise in the Y-direction. The first stage 1 is made with more than one bolt hole 52 in which a fastening bolt fits to secure the first stage 1, which lies over the base stage 4, onto the sliders 8 of the linear motion guide units 5 installed on the base stage 4. Held on a lower surface of the overhang 19 is the secondary side 48 of the first linear motor 11. Underneath the overhang 19 there is also provided two projections, which are spaced apart from one another and arranged to lie at fixed space apart on opposite sides with respect to a stopper 47 on the base stage 4, one to each side, so as to serve as stopper means 58 that, when coming into abutment against the stopper 47 on the base stage 4, will keep the first stage 1 against escape out of the base stage 4.

The first stage 1 has mounted thereon with a pair of linear motion guide units 6 lying across the first window 40A, one to each side, with extending in parallel with one another in the Y-direction. On the apron 21 there is installed the second linear motor 12 to force the second stage 2 in the Y-direction towards any desired position. Linear movement of the second stage 2 in the Y-direction relatively to the first stage 1 is guided through the second linear motion guide units 6 each composed of a second track rail: the elongated track rail 7 lying on the first stage 1 in the Y-direction, and a second slider: the slider 8 mounted underneath the second stage 2 and supported on the track rail 7 for linear movement. The second linear motor 12 is just the same with the first linear motor 11 in construction. On the apron 21 there is mounted a primary side 55 of the second linear motor 12, which parallels the Y-direction. The apron 21 has mounted thereon with a bed 80 on which are in turn installed a sensor 56 and armature windings 53 making up an armature winding assembly 54 for the primary side 55. Secondary side, not shown, of the second linear motor 12 is secured to the bottom of the overhang 22 so as to extend in the Y-direction in the second stage 2. The apron 21 is provided thereon the stopper 57 that, when cooperating with the stopper projecting downwards underneath the second stage 2, serves for keeping the second stage 2 against runaway beyond a preselected travel range. The stopper on the overhang 22 is constituted with a bolt head extended nearby the bed of the second linear motor 12.

Underneath the overhang 19 of the first stage 1 there is mounted the table 59 on which the field magnets 49 are arranged in straight line in the Y-direction to form the secondary side 48 of the first linear motor 11. The overhang 19 has also mounted with an origin mark 50 and a linear scale 51 that extends in parallel with the field magnets 49. First sensing means for determining a relative position of the first stage 1 to the base stage 4 is constituted with an optical encoder that is made up of the optical linear scale 51 in FIG. 10 and the sensor 45 mounted to the base stage 4 in opposition to the optical linear scale 51. Second sensing means for determining a relative position of the second stage 2 to the first stage 1 is another optical encoder made up of the optical linear scale installed on the second stage 2 and the sensor 56 in FIG. 10 mounted to the first stage 1 in opposition to the optical linear scale.

The turning linear motor 13 is similar with the second linear motor 12 in construction. A bed serving as a primary side 34 of the turning linear motor 13 is mounted on the platform 23 to extend lengthwise in the X-direction, while the secondary side 39 of the turning linear motor 13 is held underneath the turning stage 3. The turning linear motor 13 is different from the second linear motor 12 in only the sensing means for determining a relative position between the confronting stages. The turning stage 3 is of a rectangular plate that is made at the center thereof with a third rectangular window 16, which is placed in alignment with the second window 35 of the second stage 2. Underneath the turning stage 3 there is provided the annular boss 27 extending downwards and surrounding around the third window 16. The inner ring of the rolling bearing means 32 fits over the annular boss 27. The turning stage 3 also has the lug 24 protruding roughly midway any one end of ends of turning stage 3, which are opposite to one another in the X-direction of the turning stage 3.

Figure 7:
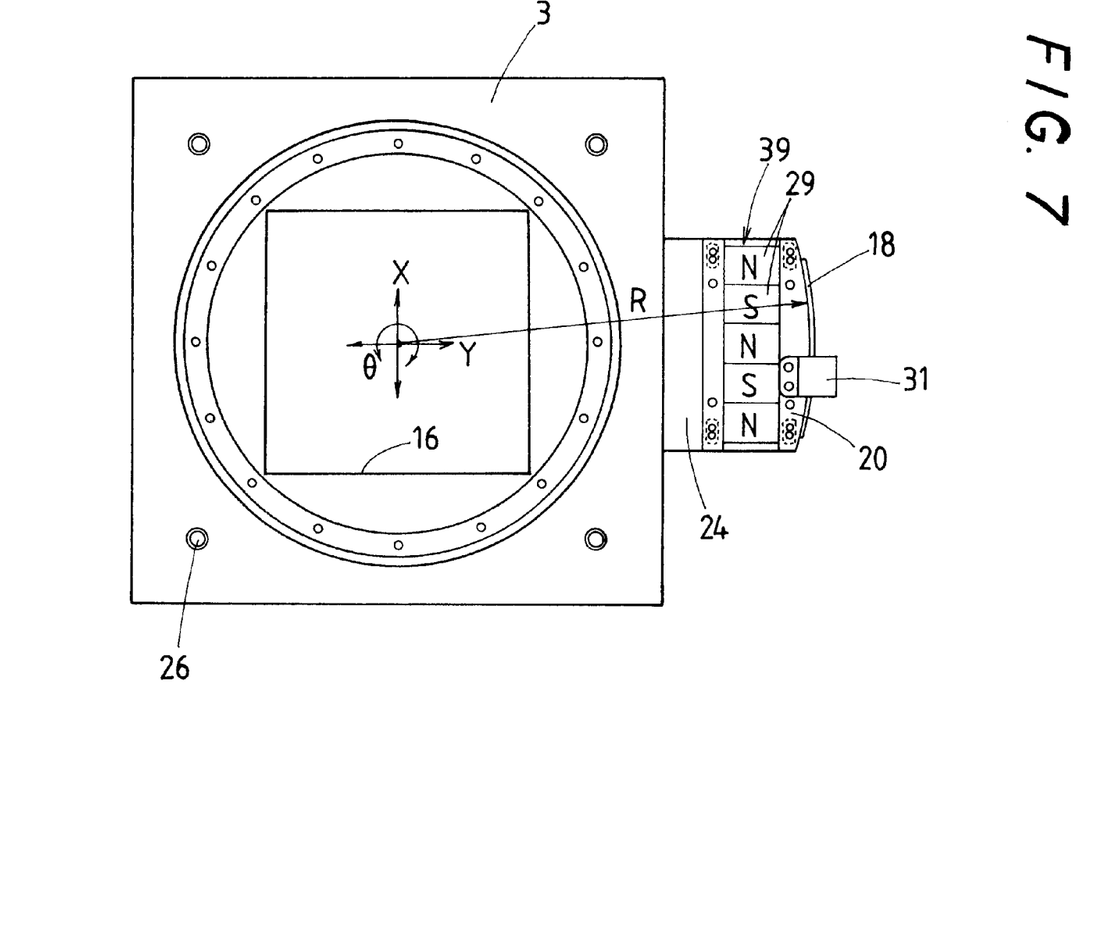
FIG. 7 is a bottom plan view of the turning stage in the stage system shown in FIGS. 1 and 2.

The turning stage 3 lies on the second stage 2 for angular movement through the rolling bearing means 32 of the cross-roller bearing. Underneath the lug 24 there is fastened a secondary side 39 of the turning linear motor 13. The turning stage 3 is also made with more than one bolt hole 26 in which a fastening bolt fits to hold any part or component such as a work and so on to the turning stage 3. Sensing means for angular shift of the turning linear motor 13 is attached on the arched periphery of the turning stage 3 to match well with the angular movement of the turning stage 3, as opposed to the prior sensing means lying in parallel with the secondary side of the field magnets that are arranged underneath the table with the magnetic poles alternating lengthwise in polarity. With the embodiment stated here, the outermost periphery of the lug 24, as shown in FIG. 7, defines arched surface having a radius R of curvature, on which surface is attached the linear scale 18.

Figure 6:
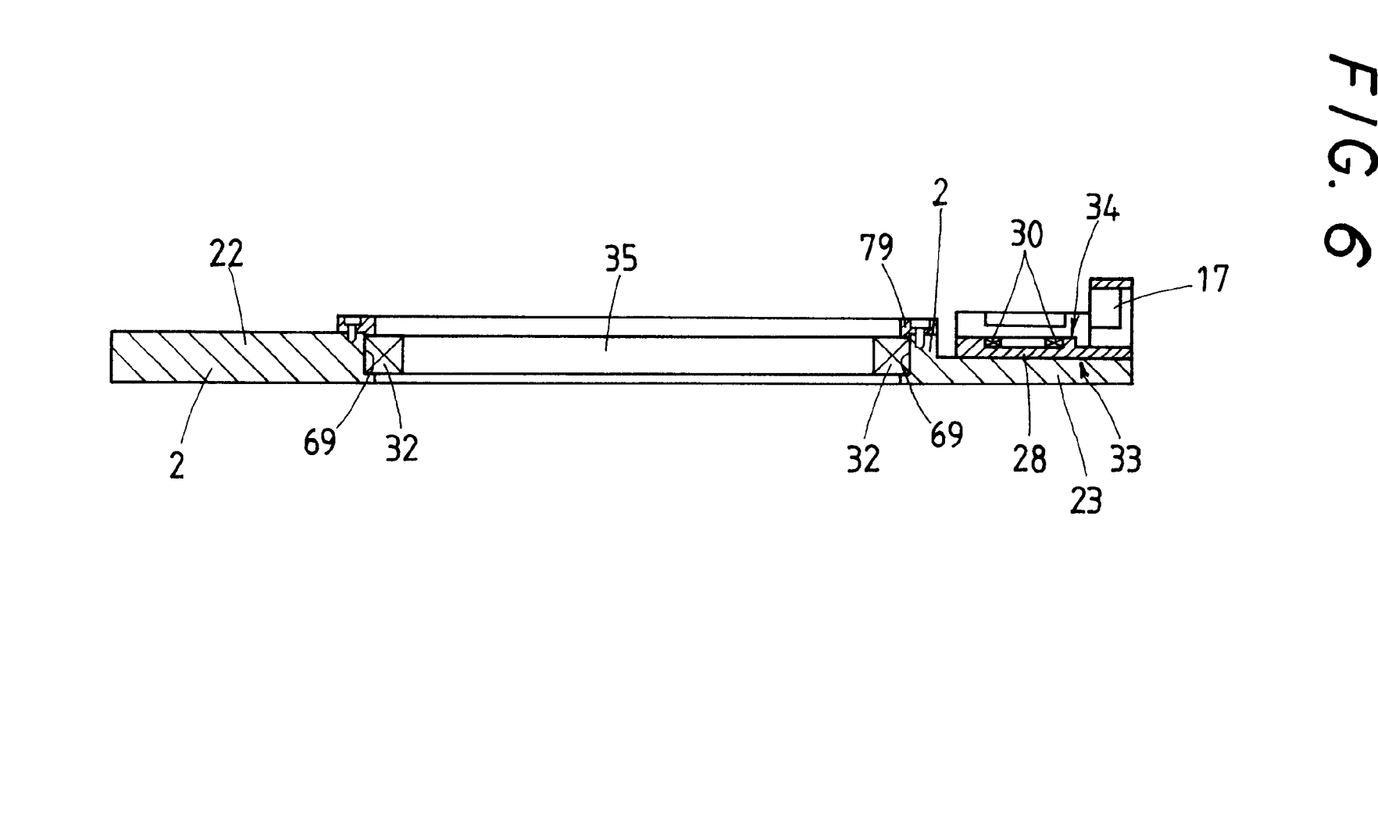
FIG. 6 is a sectional view of the second stage taken on the plane of the lines II—II of FIG. 5.

The present sensor 17, as shown in FIGS. 4 and 6, is installed on the bed 42 of the primary side 46 in opposition to the linear scale 18, with being different in direction by 90 degrees than the prior art. As seen from FIGS. 4 and 7, the origin mark 31 installed the table of the secondary side 39 or the bottom of the lug 24 is arranged so as to lie just below the sensor 17.

What is claimed is:

1. A stage system with onboard linear motor, comprising an anti-turning stage kept against rotation, a turning stage lying on the anti-turning stage for rotation relatively to the anti-turning stage, a rolling bearing means interposed between the anti-turning stage and the turning stage to support the turning stage for free rotation, and a turning linear motor for driving the turning stage over a tiny amount of angle in either direction of rotation, wherein the turning linear motor is comprised of a primary side of more than one armature winding arranged in juxtaposition in straight line on either one of the turning stage and the anti-turning stage, and a secondary side of field magnets arranged in juxtaposition in opposition to the armature winding on another of the turning stage and the anti-turning stage, with magnetic poles alternating in polarity in straight line.

2. A stage system with onboard linear motor, constructed as defined in claim 1, wherein the turning linear motor is oriented so as to extend in line with a tangent of an arc depicted by the turning stage.

3. A stage system with onboard linear motor, constructed as defined in claim 1, wherein the turning linear motor has a means for sensing a position of the turning stage in turning direction with respect to the anti-turning stage, the sensing means being composed of a linear scale graduated lengthwise in fine pitches and attached on the arched periphery of the turning stage, and a sensor element installed in opposition to the linear scale to read graduations on the linear scale.

4. A stage system with onboard linear motor, constructed as defined in any one of claims 1 to 3, wherein the rolling bearing means is constituted with a cross-roller bearing that is composed of an inner ring, an outer ring arranged around the inner ring for rotation with respect to the inner ring, and roller interposed between the inner ring and outer ring, with their rolling axes being crossed alternately one another.

5. A stage system with onboard linear motor, constructed as defined in claim 4, wherein the anti-turning stage is made at central area thereof with an aperture in which the outer ring of the rolling bearing means is fitted, while the turning stage is provided with an annular boss having an outside periphery around which the inner ring of the rolling bearing means fits over the annular boss, and the turning stage is also made at a center thereof with a rectangular window that is in alignment with the aperture in the anti-turning stage.

6. A stage system with onboard linear motor, constructed as defined in claim 1, wherein the anti-turning stage is composed of a first stage lying on a base stage for linear movement in an X-direction relatively to the base stage, and a second stage lying on the first stage for linear movement relatively to the first stage in a Y-direction crossing the X-direction, and the turning stage lies on the second stage to be supported through the rolling bearing means on the second stage.

7. A stage system with onboard linear motor, constructed as defined in claim 1, wherein a first linear motor is provided to move the first stage to a desired position in the X-direction, and a second linear motor is provided to move the second stage to a desired position in the Y-direction.

8. A stage system with onboard linear motor, constructed as defined in claim 7, wherein the turning, first and second linear motors equally have one set of three armature windings, each of which carries any one phase of three-phase conduction system, and the first, second and turning stages are each propelled to their desired positions by virtue of electromagnetic force that will be generated when three-phase current in the armature windings interacts electromagnetically with field flux created by the field magnets.

9. A stage system with onboard linear motor, constructed as defined in claim 8, wherein the field magnets are made of rare-earth magnet and five pieces of field magnets are arrayed in straight line in opposition to each set of three armature windings.

10. A stage system with onboard linear motor, constructed as defined in claim 1, wherein linear movement of the first stage in the X-direction relatively to the base stage is guided through a first linear motion guide unit that is composed of an elongated track rail lying on the base stage in the X-direction and a first slider mounted to the first stage and supported on the track rail for linear movement, while linear movement of the second stage in the Y-direction relatively to the first stage is guided through a second linear motion guide unit that is composed of a second track rail lying on the first stage in the Y-direction and a second slider mounted to the second stage and supported on the track rail for linear movement.

11. A stage system with onboard linear motor, constructed as defined in claim 1, wherein the first, second, and turning stages are equally made with transparent windows, which parallel each other.

12. A stage system with onboard linear motor, constructed as defined in claim 6, wherein first sensing means for determining a relative position of the first stage to the base stage is constituted with an optical encoder that is made up of an optical linear scale attached to the first stage and a sensor element mounted to the base stage in opposition to the optical linear scale, while second sensing means for determining a relative position of the second stage to the first stage is another optical encoder made up of an optical linear scale installed on the second stage and a sensor element mounted to the first stage in opposition to the optical linear scale.

13. A stage system with onboard linear motor, constructed as defined in claim 6, wherein all the first, second and turning stages are made in a form of rectangular plate.

* * * * *